United States Patent
Seo et al.

(10) Patent No.: US 11,682,357 B1
(45) Date of Patent: Jun. 20, 2023

(54) HEADS UP DISPLAY

(71) Applicant: Harman International Industries, Incorporated, Stamford, CT (US)

(72) Inventors: Junghoon Seo, Seoul (KR); Daehyoun Byoun, Seoul (KR); Kugjin Cho, Seoul (KR); Chulmin Lee, Gyeonggi-do (KR)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/651,774

(22) Filed: Feb. 18, 2022

(51) Int. Cl.
*G09G 3/34* (2006.01)
*B60K 35/00* (2006.01)

(52) U.S. Cl.
CPC ............ *G09G 3/342* (2013.01); *B60K 35/00* (2013.01); *B60K 2370/1529* (2019.05); *B60K 2370/33* (2019.05); *G09G 2320/0285* (2013.01); *G09G 2320/0626* (2013.01); *G09G 2330/02* (2013.01); *G09G 2354/00* (2013.01); *G09G 2380/10* (2013.01)

(58) Field of Classification Search
CPC .. G02B 27/0101; G02B 27/022; G02B 30/27; G02B 5/20; G02B 2027/014; G02B 2027/0181; G02B 2027/0196
See application file for complete search history.

(56) References Cited

U.S. PATENT DOCUMENTS

| | | | | |
|---|---|---|---|---|
| 10,831,022 | B2 * | 11/2020 | Kobashigawa | .... G02B 27/0101 |
| 2020/0005731 | A1 * | 1/2020 | Yang | .................. G09G 3/3426 |
| 2021/0096362 | A1 * | 4/2021 | Zhang | ................ G02B 27/0101 |

FOREIGN PATENT DOCUMENTS

| | | |
|---|---|---|
| EP | 3451044 A1 | 3/2019 |
| JP | 6299523 B2 | 3/2018 |
| JP | 2020112668 A | 7/2020 |

* cited by examiner

*Primary Examiner* — Nelson M Rosario
(74) *Attorney, Agent, or Firm* — McCoy Russell LLP

(57) ABSTRACT

Embodiments are disclosed for a method for controlling backlighting of a heads up display of a vehicle. In one example, the method includes adjusting different backlighting regions of the heads up display differently without analyzing a displayed image. In another example, different backlighting regions include a first region and a second region that do not overlap, and adjusting is based on a vehicle operating parameter, user input, and/or a vehicle mode. In another example, backlighting is controlled via a backlight with an array of light emitting elements, and regions include separate adjacent groups of light emitting elements.

19 Claims, 8 Drawing Sheets

| OBSTACLE DETECTION | TURN SIGNAL | GEAR | DISPLAY REGION | BACKLIGHT LEVEL |
|---|---|---|---|---|
| OBSTACLE | ON | F | 1 | 25% |
| | | | 2 | 75% |
| | | | 3 | 25% |
| | | | 4 | 75% |
| | | R | 1 | 50% |
| | | | 2 | 0% |
| | | | 3 | 25% |
| | | | 4 | 0% |
| | OFF | F | 1 | 25% |
| | | | 2 | 75% |
| | | | 3 | 0% |
| | | | 4 | 75% |
| | | R | 1 | 50% |
| | | | 2 | 0% |
| | | | 3 | 0% |
| | | | 4 | 0% |
| NO OBSTACLE | ON | F | 1 | 25% |
| | | | 2 | 25% |
| | | | 3 | 25% |
| | | | 4 | 50% |
| | | R | 1 | 50% |
| | | | 2 | 0% |
| | | | 3 | 25% |
| | | | 4 | 0% |
| | OFF | F | 1 | 25% |
| | | | 2 | 25% |
| | | | 3 | 0% |
| | | | 4 | 0% |
| | | R | 1 | 50% |
| | | | 2 | 0% |
| | | | 3 | 0% |
| | | | 4 | 0% |

FIG. 5

| Image type | Size (pixel) | Image location (pixel start coordinates) | LED driving |
|---|---|---|---|
| Speed Warning | 20 x 20 | (40,40) | X-axis : 3~4 block<br>Y-axis : 3~4 block<br>ⓐ zone |
| Lane Departure Warning | 60 x 50 | (80,80) | X-axis : 5~9 block<br>Y-axis : 5~6,7 block<br>ⓑ zone |
| Turn By Turn (fish bone) | Base Size 30 x 30 | The size (scale) of the image varies depending on where it is displayed. | Drive Block Size and Location Variable |

HEADS UP DISPLAY

FIELD

The disclosure relates to local dimming of a picture generation unit for providing a heads up display.

BACKGROUND

Augmented reality systems may be used to insert virtual (e.g., computer-generated) objects into a field of view of a user in order to make the virtual objects appear to the user to be integrated into a real-world environment. For example, a see-through display device may both display virtual objects and allow light from a real-world environment to pass through to a viewer, such that the viewer sees the real-world environment and the virtual objects through the display device.

SUMMARY

See-through displays may be used in a variety of environments, including a vehicle heads up display (HUD). Such heads up displays often provide a two-dimensional display and/or augmented reality experience that overlays images in a projected space that occupies up to two planes (e.g., a near plane and a far plane). In many examples, a heads up display may include at least an image generator (also called a picture generation unit or display), an optical system (e.g., mirrors, optical lens), and a transmissive screen (e.g., windshield). As some examples, images projected onto a vehicle heads up display may include speed, driving instruction (e.g., turn-by-turn), warnings, and alerts, and so on.

One component of the image generator of an HUD is a backlight unit. Common sources of backlight include an array of light-emitting elements such as light-emitting diodes (LEDs), laser beams, or other types of light sources. In applications, LEDs or other backlight sources may be powered on regardless of the type or amount of information displayed. However, in some environments, issues such as power consumption, heat production, and heat dissipation present challenges to the integration of heads-up displays with vehicle systems. As one example, excess heat may damage components of the image projection system (e.g., liquid crystal displays) and heat dissipation strategies often involve in bulkier design to resolve thermal issues. Furthermore, as vehicles operate on fuel (e.g., gasoline, electricity, natural gas, and/or a combination thereof), it may be beneficial to keep a power consumption of in-vehicle elements as low as possible.

One solution to reduce power consumption and heat is to selectively drive the backlighting to reduce powering backlights that are not used in generating a desired image. Selective drive of backlighting, also called local dimming, uses image analysis algorithms to analyze image patterns on a pixel-by-pixel level. In many examples, local dimming based on image analysis demands high performance processors to implement and may lag in real-time applications. The disclosure provides strategies for controlling backlighting of a heads up display that address some of the aforementioned challenges.

As one example, the disclosure provides for a method for controlling backlighting of a heads up display of a vehicle, comprising: adjusting different backlighting regions of the heads up display differently without analyzing a displayed image.

As another example, the method may include different backlighting regions of the heads up display. For example, the heads up display may include a first region and a second region that do not overlap. The backlighting regions may be adjusted based on one or more conditions such as a vehicle operating parameter, user input, and/or a vehicle mode. The backlight may include an array of light emitting elements and regions include separate adjacent groups of light emitting elements.

In one example, adjusting backlighting for each separate region may be based on a look-up table. The look-up table output may include a respective backlight level for each region and the inputs to the look-up table may include real-time user inputs and vehicle operating parameters. Backlighting adjustment may be ramped, such as from a first level to a second level, to gradually change light levels in one or more regions. Backlighting adjustment may further include varying a power level to the regions responsive to vehicle operating conditions, and/or user input. Regions, power levels, ramping, and other qualities of backlighting control may be set for various conditions and adjusted throughout vehicle operation. The above-described examples of a method for controlling backlighting of a heads up display may allow for efficient, selective dimming of a backlight array, and thus may have lower power consumption and heat production than other backlighting methods.

BRIEF DESCRIPTION OF THE DRAWINGS

The disclosure may be better understood from reading the following description of non-limiting embodiments, with reference to the attached drawings, wherein below:

FIG. 5 shows an example look-up table in accordance with one or more embodiments of the present disclosure;

DETAILED DESCRIPTION

The disclosure provides methods for controlling backlighting of a heads up display of a vehicle by adjusting different backlighting regions of the heads up display differently based without analyzing a displayed image. The disclosed methods address the above-described issues that may arise in image generation for a heads up display in a vehicle environment. For example, the disclosure describes a local-dimming algorithm that may reduce power consumption and heat production while demanding less processing power (CPU) relative to conventional image generation and backlighting. In one example, the disclosure provides local dimming that is selectively applied responsive to a vehicle operating parameter. Such operation provides for driving the backlighting differentially in different areas, or in limited areas only, to better match type, size, and/or position of images, but without requiring a specific image analysis of a current, past, or future image, such as pixel-by-pixel. In an embodiment, the disclosure describes storing in a look-up table a backlight LEDs corresponding to the types of information projected on HUD. Therefore, there is reduced demand for a high performance CPU to process complicated image analysis algorithms.

Figure 1:
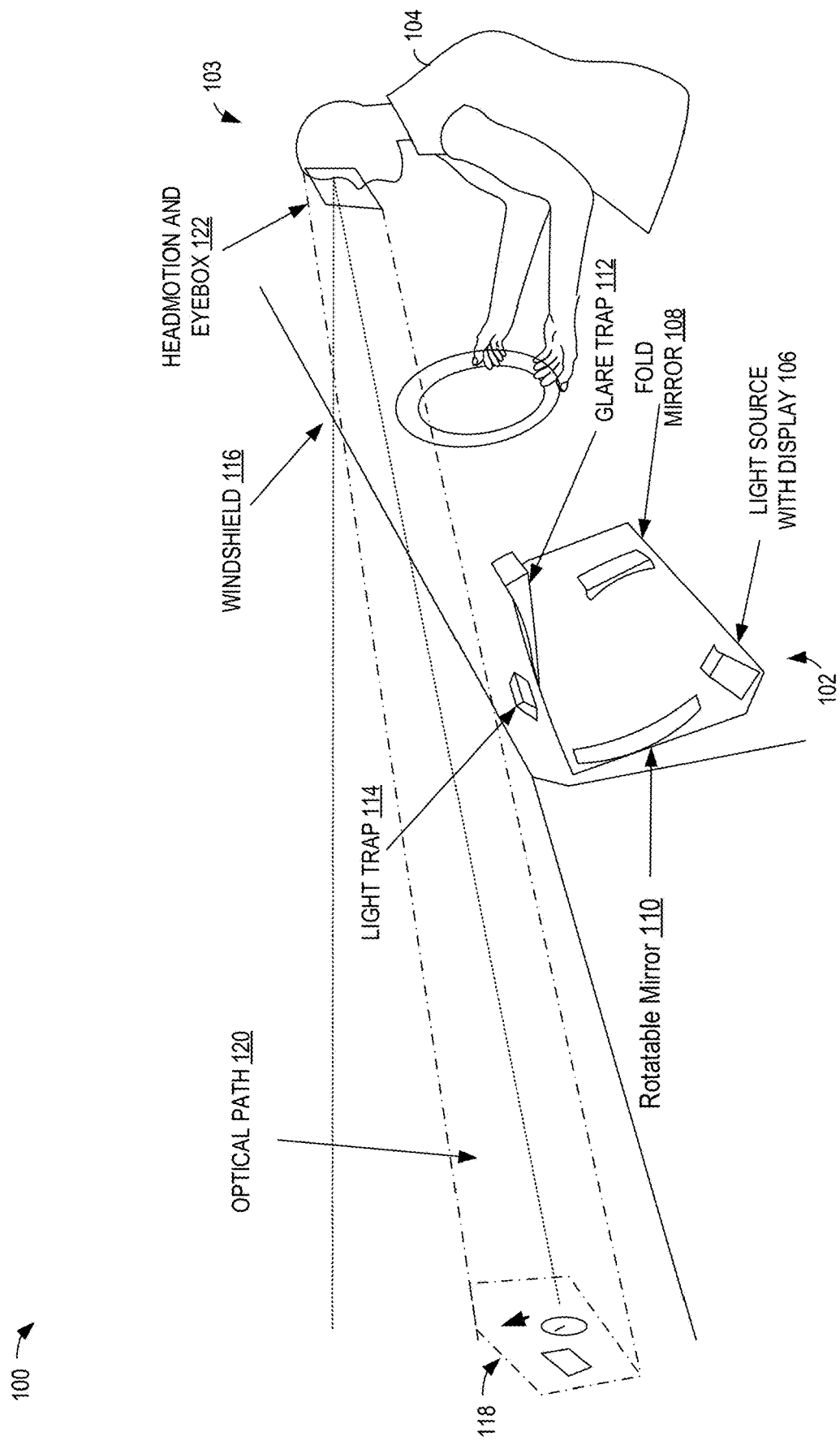
FIG. 1 shows an example augmented reality environment in accordance with one or more embodiments of the present disclosure.

FIG. 1 shows an example augmented reality environment 100, in which an in-vehicle display system 102 of a vehicle 103 is controlled to project virtual images into an environment of a user 104. The environment in the illustrated example is a vehicle, however it is to be understood that one or more of the below-described components may be included in a display configuration that is used in another augmented reality environment without departing from the scope of this disclosure.

The display system 102 includes a light source coupled with display unit 106, which may illuminate an image for a display in a controlled manner. The display unit 106 may project light toward a fold mirror 108, which may be planar or aspherical, and which reflects received light toward a rotatable mirror 110, which may be aspherical. The rotatable mirror may direct light toward a glare trap 112 and light trap 114, usable to control the light to appear in a position that is viewable through a windshield 116 to appear at a virtual location 118. The virtual location 118 may be controlled to be within an optical path 120 that originates from a head-motion and eyebox 122 of the user 104 and represents at least a portion of a viewable range of the user 104.

Figure 2:
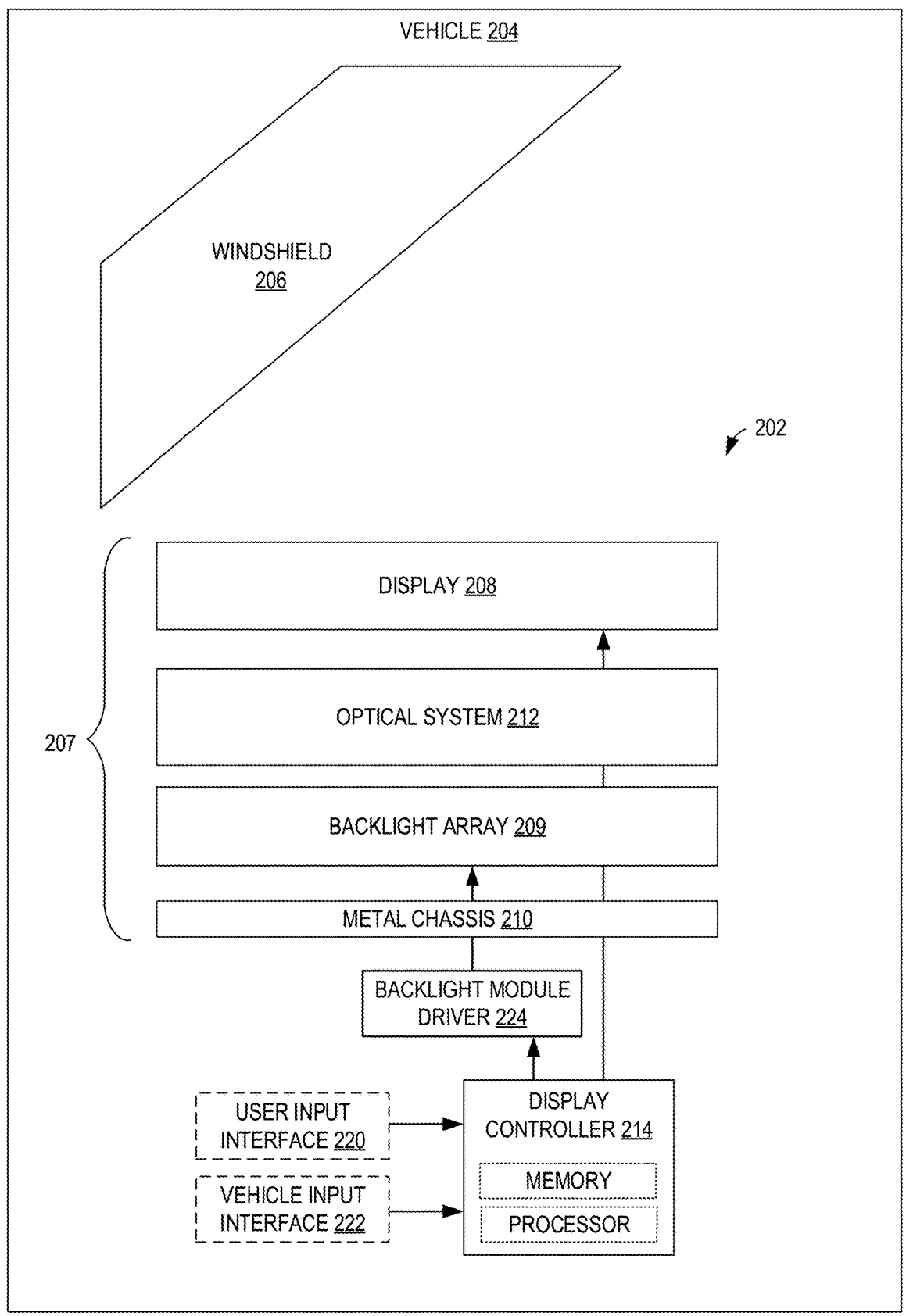
FIG. 2 shows an example block diagram of a heads up display system in accordance with one or more embodiments of the present disclosure.

As shown in FIG. 1, mirrors may be used in the display configuration within the vehicle 103. An additional or alternative embodiment may include the use of a mirrorless three-dimensional display. FIG. 2 shows an example display configuration 202 that may be included inside a vehicle 204 and configured to project light onto and/or through a windshield 206. In one example, two-dimensional images may be projected onto and/or through the windshield. An additional or alternative embodiment may include the use of a multi depth (e.g., a dual depth) windshield type heads up display, where regions of a display are mapped to depths. One such example heads up display including static and dynamic display regions is described in more in FIG. 8. The display configuration may include a display 208, an optical system 212, a backlight array 209, and a metal chassis 210 (e.g., a frame). The optical system 212 may include one or several lenses, planar or non-planar mirrors, and/or one or more prisms. The optical system 212 conducts the optical information from the display 208 to the windshield 206. The display 208 may include transmissive display technology (e.g., a liquid crystal display, LCD) and/or micro element-based display technology (e.g., digital light processing microelectromechanical system, DLP MEMS), including an image generation unit having a plurality of pixels. The optical system 212 may be oriented relative to the windshield 206 such that an entirety of the windshield or a selected portion of the windshield serves as a display surface (e.g., a transparent plane onto which three-dimensional display images are projected). The display 208 may be illuminated via backlight array 209, which may include a matrix of light emitting elements (e.g., LEDs) distributed along a back of the display 208. As an example, the backlight array may include multiple blue LEDs. As another example, the backlight array may include lasers and/or fluorescent lights. As shown, the display 208, backlight array 209, metal chassis 210, and optical system 212 may collectively form a display unit 207. Although shown separately, in some examples, display controller 214 may also be included in the display unit 207.

The display controller 214 may be a dedicated control system (e.g., a dedicated electronic control unit that only controls the display) or a combined controller (e.g., a shared electronic control unit that controls the display and one or more other vehicle systems). In some examples, the display controller may be a head unit of the vehicle 204 (e.g., an infotainment unit and/or other in-vehicle computing system). The display controller may include memory and a processor for executing instructions stored in the memory to control an output of the display 208. The display controller 214 may control the display 208 to project particular images based on the instructions stored in memory and/or based on other inputs. The display controller 214 may also control a backlight module driver 224. The backlight module driver 224 applies current to the driving area of the backlight array 209 to selectively control portions of backlighting based on instructions stored in memory and inputs including the display content and/or other conditions. Selective control of the backlight may involve dividing the backlight array into separate regions and adjusting each of the separate regions differently. Selective control may additionally or alternatively involve adjusting a size of the regions, for example, based on operating conditions. Instructions for adjusting the regions may include a look-up table for determining backlighting level based on information about the type, size, and/or position of display content. For example, portions of the backlight array 209 corresponding to the locations of the black regions of the images may be turned off. Example look-up tables are given in FIG. 5 and FIG. 7A.

In other examples, if a thermal load is predicted or detected to be above a threshold, selected light sources of the backlight array 209 may be turned off to reduce heat generation (e.g., alternating light sources in the array may be switched off so that the whole image may be displayed while only half of the light sources are generating heat, or the image may be reduced in size and light sources in the array corresponding to locations of newly black regions of the image may be turned off). Examples of inputs to the display controller 214 to control mechanism of display 208 and backlight array 209 include a user input interface 220, and a vehicle input interface 222.

The user input interface 220 and vehicle input interface 222 may be used to provide instructions to the display controller 214 to control the display based on user input and vehicle data/status, respectively. For example, user input to change a type of information displayed (e.g., to select between instrument data such as speed/RPM/etc. and navigation data such as turn directions), to select options when a graphical user interface is displayed, and/or to otherwise indicate user preferences may be provided to the display controller 214 and processed to alter a content and/or format of the data displayed via the display configuration 202. The user input interface may receive user input from any suitable user input device, including but not limited to a touch screen, vehicle-mounted actuators (e.g., buttons, switches, knobs, dials, etc.), a microphone (e.g., for voice commands), an external device (e.g., a mobile device of a vehicle occupant), and/or other user input devices. The vehicle input interface 222 may receive data from vehicle sensors and/or systems indicating a vehicle status and/or other vehicle data, which may be sent to the display controller 214 to adjust content and/or format of the data displayed via the display configuration 202. For example, a current speed may be supplied (e.g., via a controller-area network, CAN, bus of the vehicle) to the vehicle input interface and sent to the display controller to update a display of a current speed of the vehicle. As another example, a vehicle rear view may be supplied by one or more rear view cameras. As yet another example, obstacle detection input may be supplied by one or more bumper-mounted ultrasonic sensors. The vehicle input interface may also receive input from a navigation module of a head unit of the vehicle and/or other information sources within the vehicle.

Additional or alternative embodiments may include modules for tracking eye movement of a user (e.g., a driver) and/or sunload using one or more sensors of the system. Eye tracking and/or sunload information, whether received by or determined at the display controller, may be used by the display controller to control one or more display characteristics such as regions of the windshield onto which display light from the display 208 may be projected.

The user input interface and vehicle input interface, along with additional modules, may be used as real-time inputs for controlling content and light levels of a heads up display. For example, the inputs may determine display content to enhance a driving experience. The inputs may be determined parameters, operating modes, user input actions, etc., as described herein. As another example, the inputs may be used to selectively dim or brighten the display content.

Figure 3:
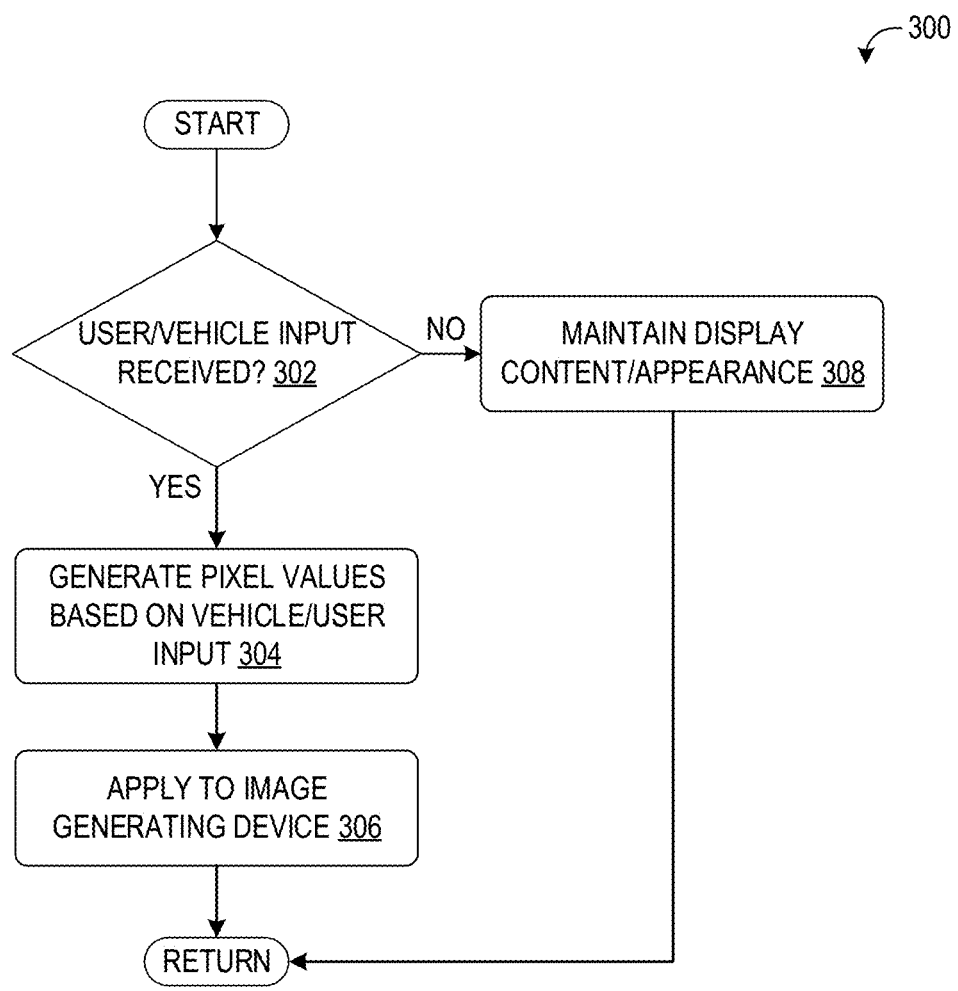
FIG. 3 shows an example flow chart of a method for adjusting a heads up display in accordance with one or more embodiments of the present disclosure.

FIG. 3 is a flow chart of an example method 300 of controlling the content of a display based on user input, and/or vehicle input. Method 300 may be performed by a control system in correlation with other devices (e.g., display controller 214, user input interface 220, and vehicle input interface 222 of FIG. 2). At 302, the method includes determining if user or vehicle input is received. If user or vehicle input is not received (e.g., "NO" at 302), the method may include maintaining a display content and/or appearance (e.g., not changing the display), as indicated at 308. If user or vehicle input is received (e.g., "YES" at 302), the method includes generating pixel values based on the user and/or vehicle input, as indicated at 304. For example, pixel values may be generated to display a user input selecting a menu option. In such an example, different displayed information may be presented responsive to user input selecting a different view. As another example, pixel values may be generated for a content adjustment to satisfy a user preference (e.g., where the user may specify an increase in display size, or another change in display appearance, or where the user may specify a different display mode, a display shut down, etc.). As another example, pixel values may be generated to output an updated vehicle parameter (e.g., a vehicle speed, engine RPM, etc.) responsive to data from the vehicle indicating the vehicle parameter. As an example, pixel values may be generated by combining various images (e.g., left camera, right camera, rear camera, etc.). The user/vehicle input may also include a user/vehicle status that reflects a user workload or environmental condition that is used to change a parameter of the displayed data. For example, responsive to indications from a user (e.g., stress detection) and/or from the vehicle (e.g., obstacle detection, increased traffic, difficult navigation maneuvers, inclement weather conditions, etc.), pixel values may be generated to adjust display content to assist the user in concentrating on driving tasks (e.g., the displayed content may be reduced in size/brightness, the displayed content may be moved to a less prominent location such as a far side of the windshield, the displayed content may be temporarily turned off, etc.). Likewise, after determining that driving conditions and/or user status has returned to a state in which a heads up display may not be distracting (e.g., reduced traffic, disappearance of obstacle, passing difficult navigation maneuvers, clearing weather, etc.), the displayed content may be returned to a previous location and/or appearance, and/or may be turned back on.

Upon generating pixel values based on vehicle/user input, the method continues to 306, where pixel values are applied to the image generating unit (e.g., display 208). As an example, the display may be divided into regions such as thirds or quadrants. In some examples, image processing may be executed for one or more of the regions independently and the generated image applied to the region. For example, a first image may be displayed in a first quadrant and a second image may be displayed in a second quadrant. Display regions may or may not correspond to regions of the backlight array (e.g., described further with respect to FIG. 4).

Method 300 is an example of image processing method for a display in an HUD system. Additional or alternative image processing methods may be implemented for generating display content. The selective dimming methods described herein, such as method 400 in FIG. 4, may complement a variety of image processing methods.

Figure 4:
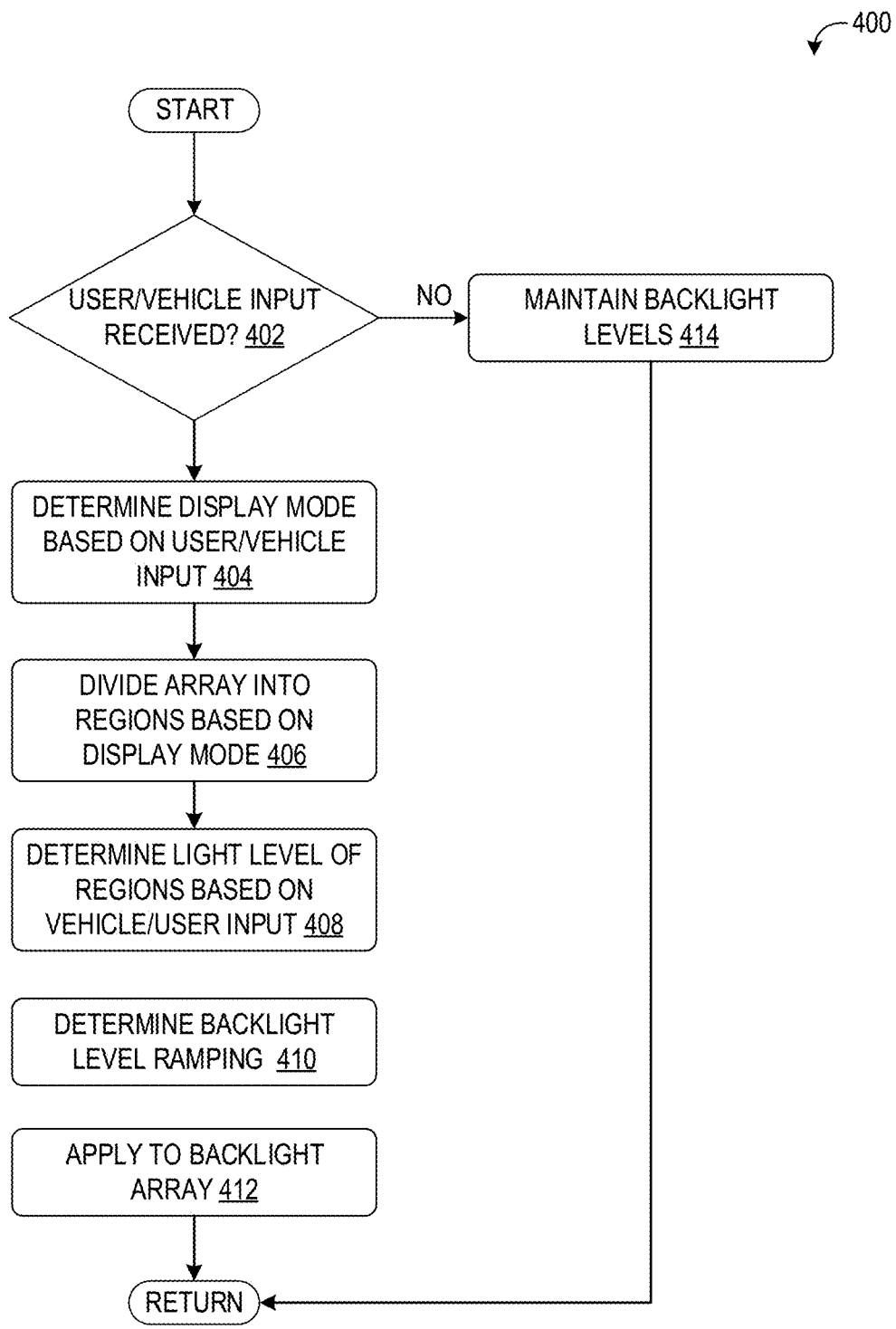
FIG. 4 shows an example flow chart of a method for adjusting a backlight for a heads up display in accordance with one or more embodiments of the present disclosure

FIG. 4 is a flow chart of an example method 400 for controlling a backlight array included in a heads up display based on user input, and/or vehicle input, which runs in parallel with the routine of FIG. 3. Method 400 may be performed by a control system in correlation with other devices (e.g., display controller 214, user input interface 220, and vehicle input interface 222 of FIG. 2). At 402, the method includes determining if user or vehicle input is received. If user or vehicle input is not received (e.g., "NO" at 402), the method may include maintaining backlight levels (e.g., not changing the appearance of the display), as indicated at 414. If user or vehicle input is received (e.g., "YES" at 402), the method includes determining a vehicle mode (herein referred to as a display mode) based on the user and/or vehicle input, as indicated at 404. For example, the display mode may be determined based on user input selecting a menu option. In such an example, a different mode of display may be presented responsive to user input selecting a different view. As another example, the display mode may be determined based on a vehicle parameter (e.g., a vehicle speed, global position, etc.) responsive to data from the vehicle indicating the vehicle parameter. For example, the mode may include whether navigation is active, whether a turn signal is on, whether obstacle detection is highlighting an object in front of the vehicle, and so on. Similar to method 300, user/vehicle input may also include a user/vehicle status that reflects a user workload or environmental condition that is used to change a parameter of the displayed data. For example, responsive to indications from a user (e.g., distraction detection) and/or from the vehicle (e.g., obstacle detection, increased traffic, difficult navigation maneuvers, inclement weather conditions, etc.), the display mode may be determined. As an example, conditions of the display such as how the content of display is arranged and/or subdivided (e.g., into regions) and types (e.g., categories) of content displayed may change based on the mode.

Upon determining the display mode, the method includes dividing the backlight array into a plurality of non-overlapping regions based on display mode, as indicated at 406. Regions of the array may be divided into two, three, four, etc., separate adjacent groups of LEDs that do not overlap. To elaborate, the display may be divided into three regions during an exemplary first mode, e.g., standard mode, and divided into four regions for a second exemplary mode, e.g., alert mode. As a further consideration, the dividing of the array may also be based on the backlight array provided. For example, the physical layout of the array may determine boundaries of regions due to the number, arrangement, and/or density of LEDs. In one examples, the display mode may determine the backlight array dividing and vehicle operating conditions and/or user input may determine the display mode. Additionally or alternatively, vehicle operating conditions and/or user inputs may determine the backlight array dividing.

Upon dividing the backlight array into a plurality of different backlighting regions based on display mode, the method includes determining light level of the display regions based on user and/or vehicle input, as indicated at 408. As one example for an input, the method includes feeding the vehicle operating condition (or other input) to a look-up table to generate a light level or power level for one or more display regions. A plurality of inputs may include real-time user inputs and vehicle operating parameters may be categorized, such as based on type, size, and region of display, and so on. The look-up table then determines a respective backlight level or power level for each of the regions such as regions where one or more images will appear. As an example, type, size, and position of input may be referenced in the look-up table. Some example input types may include vehicle status information and/or instrument panel type display data, such as a vehicle speed, vehicle warnings/alerts (e.g., oil level, temperature, maintenance reminders, diagnostic code warnings, etc.), engine RPM, tachometer information, remaining fuel level/estimated distance that can be traveled on the remaining fuel, notifications (e.g., from a connected mobile device, such as incoming communications), current time, radio/audio information (e.g., current radio station, currently-played song, etc.), graphical user interface controls, and/or other display elements. Input size may include information such as pixel number or relative category such as small or large image. Position may include the region of the display (e.g., divisions) where an image may be displayed. Each of the display regions may be powered at a different power level and each of the different power levels may be adjusted responsive to the vehicle operating conditions (e.g., the inputs) without analyzing the displayed image on the HUD.

As example, with the backlight array divided into non-overlapping regions, such as at least a first region, a second region, and a third region, a first set of conditions (e.g., inputs) may produce look-up table outputs including a power set for each separate region at a first level, a second, and a third level, respectively. A second set of conditions may produce a power set for the same regions at a fourth level, fifth level, and a sixth level. As a further example, during another set of conditions different from the first, the backlight may be divided into at most a first region and second region, with the power levels for the first and second regions set a fourth level and a fifth level, respectively. In some examples, each level for the each respective region may be different from every other level.

To elaborate further, as an example, a turn signal input is received. The input is classed as a vehicle status type of input for the given mode. The type of input for the mode determines a position in the first third of the display and the look-up table determines driving 50% of the LEDs in the array in the first third of the display. One or more additional (e.g., concurrent) inputs simultaneously determine a power level for the two other regions of the display, such that the first set of conditions produces driving LEDs at 50%, 20%, and 75%, for three regions, respectively. The turn signal input in a second mode, such concurrent with other, different, inputs, may produce a second, different, output power level. For example, the turn signal input may determine driving 30% of the LEDS in the first third or first half of the array, 25%, and 15% in the adjacent regions in the second mode. In this way, different combinations of inputs may produce different combinations of power levels and arrangements.

The method includes determining a level of backlight ramping, as indicated at 410. For example, powering the different backlighting regions may include adjusting a backlight level from a first value (e.g., power level) to a second value may include ramping up or down over a transition duration. Ramped adjustment has the advantage of producing gradual, rather than instantaneous, transition in the display appearance, and may be preferred by vehicle operators. In some examples, a rate of ramping may be an output of the look-up table. As one example, in a given mode, some regions may ramp faster or slower than other regions. Additionally, the rate of ramping may proceed differently and at separate times for different regions.

At 412, the method includes applying the output light level to the backlight array. As one example, applying the output light levels to the backlight array may include the backlight module driver applying current to the area of the array according to the look-up table output. As another example, applying the output power levels to the backlight array may include adjusting the regions of the display at the specified ramp rate. As an example, a backlight adjustment for a given table output transitions from a first mode with all regions at 50% to a second mode with 3 regions at 50% and a first region and 24%. The controller applies a rate of ramping to the first region at 24% and applies no ramping to the 3 regions at 50%. Shortly thereafter, while the first region is still transitioning to 24% another input comes in, which now makes a second region transition to 24%. The rate of ramping for the second region may be faster than first region already transitioning power level. In this way, the display appearance and backlight level transitions gradually and smoothly.

FIG. 5 shows an example look-up table 500 for a method for controlling a backlight array of LEDs included in a heads up display based on user and/or vehicle input. As illustrated in look-up table 500, a user and/or vehicle input may be classified by type and status (e.g., value) to determine a level of backlight in one or more region of the display. In the example, types include obstacle, turn signal, and gear inputs. Obstacle status includes obstacle or no obstacle. Turn signal status includes turn signal on or off. Gear status includes forward or reverse gear. For reference, look-up table 500 is shown as a two-dimensional table. In other embodiments, the method may include one or more multi-dimensional look-up tables.

In the example, the display is divided into four regions based on a display mode (e.g., user selected, determined by vehicle operating conditions, etc.). In another mode, the display may be divided into fewer or more regions. The regions may display content such as vehicle status information, instrument panel data, navigation, environmental features, and so on. The information displayed may be determined by the display controller and based on operating conditions indicated by user and/or vehicle inputs, as described in method 300. The four regions may be backlit at different levels based on the type, size, and/or position of image to be displayed, as described in method 400. For example, for a first input type, such as a type corresponding to rear camera image display, a first level of backlight may be determined. For a second input type, such as corresponding to speedometer display, a second level of backlight may be determined. Thus, if an input indicates a camera display type image, the method may adjust backlighting level accordingly, for example, to compensate for a brighter display or larger display area without analyzing the content of the image to be displayed.

To take a first example from look-up table 500 of FIG. 5, an operating condition may include a driver using a turn signal to indicate a reverse parking operation. Look-up table inputs may include sensors signals indicating obstacle (e.g., no obstacle), turn signal (e.g., on), and gear (e.g., reverse). In such an example, backlight levels may be determined for the four regions of the display based on the inputs. The look-up table indicates backlight levels as follows: a first region having 50% LEDs on, a second region having 0% LEDs on, a third region having 25% LEDs on, and a fourth region having 0% LEDs on.

To take a second example from look-up table 500 of FIG. 5, an operating condition may include the driver using the turn signal to indicate a lane change. While changing lanes, a sensor detects a near-range vehicle. Look-up table inputs may include sensors signals indicating obstacle detection (e.g., obstacle), turn signal use (e.g., on), and gear (e.g., forward). In such an example, backlight levels may be determined for the four regions of the display based on the inputs. The look-up table indicates backlight levels as follows: the first region having 25% LEDs on, a second region having 75% LEDs on, a third region having 25% LEDs on, and a fourth region having 75% LEDs on.

Figure 6A:
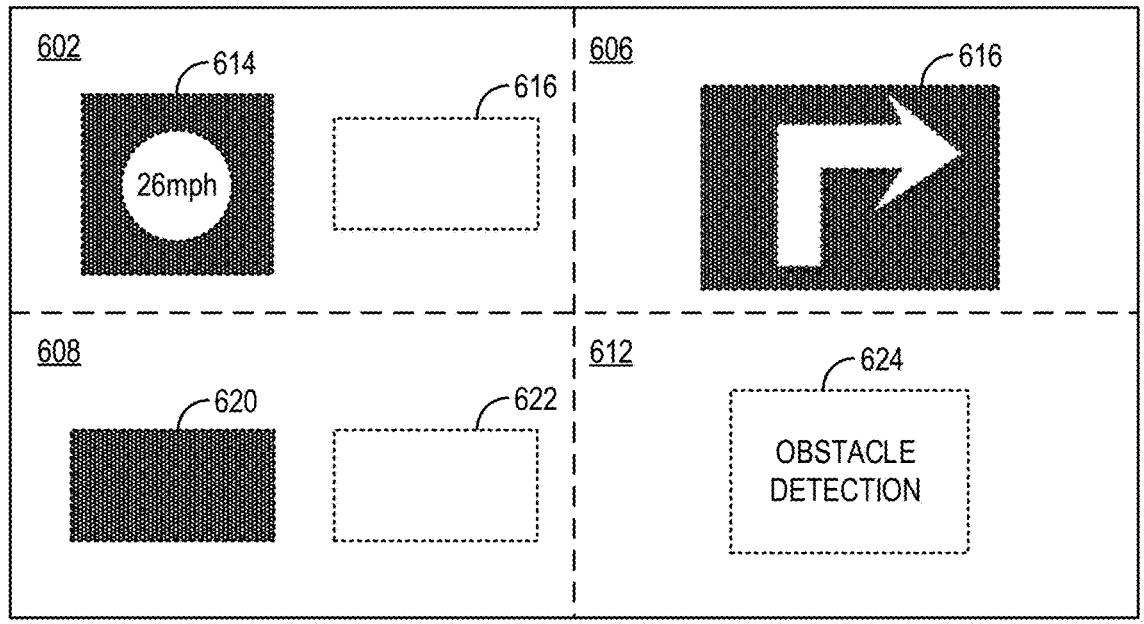
FIG. 6A shows a first example display output in accordance with one or more embodiments of the present disclosure.
Figure 6B:
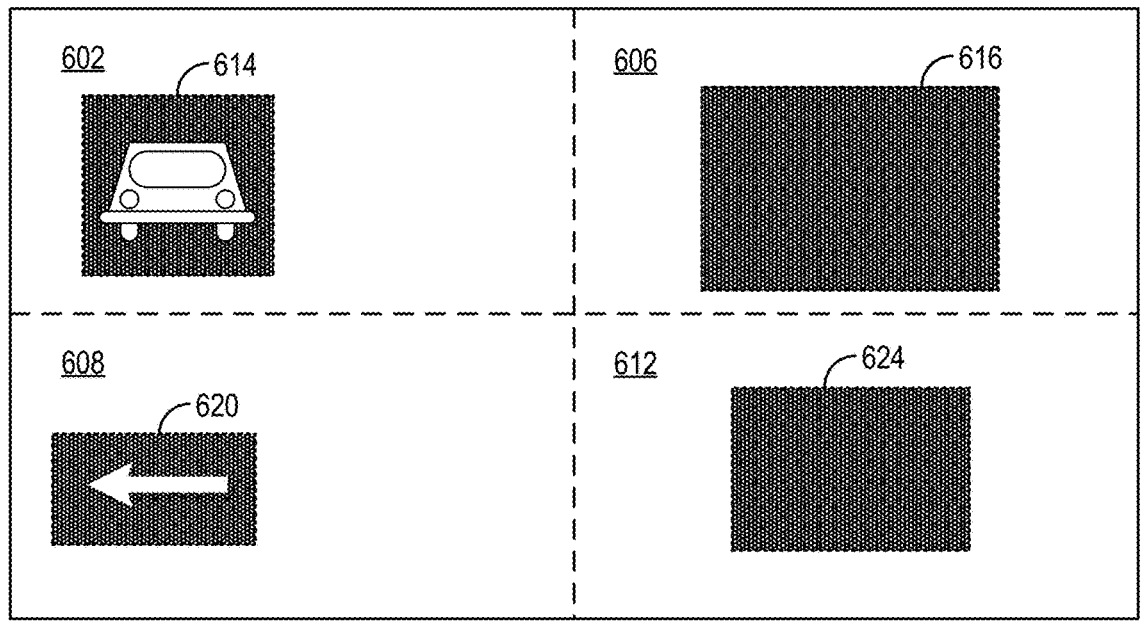
FIG. 6B shows a second example display output in accordance with one or more embodiments of the present disclosure.

FIG. 6A and FIG. 6B show example heads up display outputs. As one example, display content may be generated following control routines the same or similar to method 300 and method 400 in FIG. 3 and FIG. 4, respectively, and produced in a heads up display system such as the examples described in FIG. 1 and FIG. 2. The example heads up displays 600 and 650, shown in FIGS. 6A and 6B, respectively, display images related to an instrument panel, rear camera, navigation, vehicle status and alerts, and obstacle detection. The display content may be adjusted based on operating conditions such as user and/or vehicle inputs.

Displays 600, 650 are divided into four quadrants: a first quadrant 602, second quadrant 606, third quadrant 608, and fourth quadrant 612. In the example, the displays 600, 650 are divided into four quadrants based on a user selected display mode. The four quadrants display different types of images with varying sizes, shapes, and backlight levels. In one example, one or more quadrants of heads up display 600 and/or heads up display 650 may display static information and/or dynamic information as part of a multi depth windshield heads up display, such as described in more detail with respect to FIG. 8.

Starting first with FIG. 6A, the example display is given for a vehicle being driven forward with navigation assistance selected. A speedometer is shown in box 614 of first quadrant 602. Navigation is shown in box 616 of second quadrant 606. In the third quadrant 608, box 620 may show images related to vehicle status such as turn signal on, engine RPM, etc. The fourth quadrant 612 shows box 624, where an image may appear to emphasize a detected obstacle. Additional image content may be displayed in box 616 and/or box 622 such as in other modes and/or upon receipt of new inputs. For example, an operating condition indicating a fuel level less than a threshold level may transition the vehicle to an alert mode with six regions. In such a mode, a mileage counter to a fueling station may appear in box 616 and remaining fuel may appear in box 622.

Images shown in in FIG. 6A may be generated and adjusted following the method described in FIG. 3. Upon receipt of user and/or vehicle input, the display controller generates pixel values corresponding to the input and the pixel values may be applied to the image generating device. For example, a signal indicating reducing vehicle speed is received by the display controller. Pixel values are generated to represent the new speed. The display controller then applies the pixel values to the image generating device. The image is displayed box 614 of the first quadrant 602. As another example, a signal indicating obstacle detection may stop display of the navigation image in the second quadrant 606 and generate an image to emphasize the obstacle that is displayed in box 624 in the fourth quadrant 612.

Continuing the example of reducing vehicle speed, the backlight level for images depicted in display 600 of FIG. 6A may be adjusted in a parallel process following the method described in FIG. 4. For example, the backlight level for quadrant 602 is determined by inputting an image type "speed" into a look-up table. In one example, speed reduction and/or increase inputs may not produce a backlight level adjustment because the input type did not change. However, in some modes speed reduction or increase may determine backlight level adjustment, such as if speed reduces or increases above a threshold. In such an example, an image related to a speed alert may be generated and displayed in box 616. Correspondingly, the input to the look-up table may determine backlight level increase in quadrant 602.

As another example, if an obstacle is detected, the backlight levels may change. Obstacle detection and forward drive are input to the look-up table. The inputs determine increased backlight in the second quadrant 606 and the fourth quadrant 612. As an example, the backlight level is increased to display an image emphasizing the detected obstacle. Once the obstacle is passed, the navigation image in the second quadrant is again generated and the backlight levels adjusted correspondingly.

Continuing to FIG. 6B, the display 650 is shown for the vehicle in reverse gear with the turn signal on to indicate a reverse parking operation. First quadrant 602 no longer displays the speedometer in box 614. Instead, a rear camera image is generated in box 614. In the third quadrant 608, box 620 shows an image representing turn signal status. No image is displayed in the second quadrant 606 or the fourth quadrant 612.

Images shown in in FIG. 6B are generated and adjusted following the method described in FIG. 3. For example, upon receipt of input from the user putting the vehicle in reverse, the display controller generates pixel values corresponding to a rear camera view to aid the parking maneuver. The pixel values are applied to the image generating device and displayed in box 614 in quadrant 602. Upon receipt of the turn signal input, the display controller generates pixel values corresponding to a left-pointing arrow. The pixel values are applied to the image generating device and displayed in box 620 in quadrant 608.

The backlight level for images depicted in display 650 of FIG. 6B are adjusted following the method described in FIG. 4. For example, the backlight level for quadrant 602 is determined by inputting an image type "reverse gear" to a look-up table. In the example, reverse gear input determines an increased backlight output (e.g., relative to display 600) in quadrant 602 to display images generated by the rear camera. The backlight level for quadrant 608 is determined by inputting the image type "turn signal" to a look-up table and also outputs backlight increase relative to display 600. With no images displayed, backlighting is reduced in quadrants 606, 612 relative to display 600.

Figures 7A, 7B:
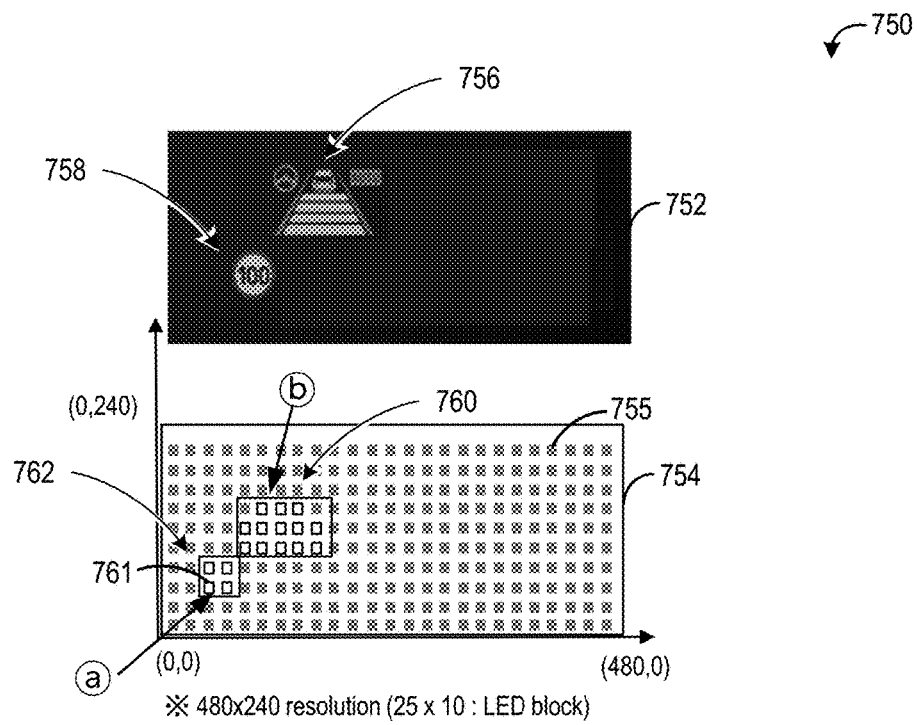
FIG. 7A shows a second example look-up table in accordance with one or more embodiments of the present disclosure.
FIG. 7B shows a third example display output in accordance with one or more embodiments of the present disclosure.

FIG. 7A and FIG. 7B show example look-up table 700 and example heads up display 750, respectively. Look-up table 700 shows display information classified by type, size, and location. Individual LEDs of the backlight array may be dimmed or driven based on the look-up table output. The result, shown in heads up display 750, is backlighting applied selectively to the area of content display. FIG. 7A shows an example look-up table 700 for controlling a backlight array of LEDs included in a heads up display based on user and/or vehicle input. In the example table 700, display content is categorized by image type, size in pixels, and image location given in pixel start coordinates. Categorized content is input to the look-up table to produce array backlighting instruction given as x and y coordinates and zone (e.g., a zone, b zone).

In the example, image types include speed warning, lane departure warning, and turn by turn (fish bone). The size of a speed warning is 20×20 pixels. The size of a lane departure warning is 60×50 pixels. Turn by turn size has a base size of 30×30 pixels. In the example, turn by turn content size varies based on the location of projection in the display. Image start location refers to pixel start coordinates in an LCD. The speed warning pixel start coordinates are (40, 40). The lane departure warning pixel start coordinates are (80, 80). Turn by turn pixel start coordinates are not given in example look-up table 700 and may vary with other inputs such as GPS. The LED driving output indicated in the look-up table 700 includes instructions to drive blocks of individual LEDs in the array given as coordinates and zones (see FIG. 7B). Speed warning input to the look-up table 700 produces instructions to drive lights in LED blocks 3-4 along the x-axis and LED blocks 3-4 along the y-axis, an LED region represented by the a zone. Lane departure warning input to the look-up table 700 produces instructions to drive lights in LED blocks 5-9 along the x-axis and LED blocks 5-6, 5-7 on the y-axis, an LED region represented by the b zone. Look-up table 700 shows output drive block size and location may vary based on turn by turn input. For example, additional factors such as real-time driving instructions based on GPS may be input to a look-up table to determine LED driving for turn by turn display content.

FIG. 7B shows an example heads up display 750 including display content 752 and LED array 754. As one example, heads up display 750 may be generated following control routines the same or similar to method 300 and method 400 in FIG. 3 and FIG. 4, respectively. In the example, look-up table 700 is used to determine LED driving for LED array 754. Heads up display 750 may be produced in a heads up display system such as described in FIG. 1 and FIG. 2.

In the example, display content 752 includes a 480×240 pixel resolution LCD. LED array 754 includes a 25×10 array of LED blocks. A dim LED block 755 is indicated as a grey block. A driven LED block 761 is indicated as a black outlined block. Images (e.g., icons) depicting speed warning 758 and lane departure warning 756 are produced in display content 752. Correspondingly, LEDs are driven individually in region 762 and region 760. Region 762 LEDs include LED blocks 3-4 along the x-axis and 3-4 along the y-axis and represented by the a zone, as described in FIG. 7A. Region 760 LEDs include LED blocks 5-9 along the x-axis and LED blocks 5-6, 5-7 along the y-axis and represented by the b zone, as described in FIG. 7A. In this way, depending on the content, size, and start location information stored in the look-up table, such as look-up table 700, LEDs are driven individually on a block basis depending on the content. Without image analysis for local dimming or complex processor-demanding operations, heads up display power consumption and heat production may be substantially reduced.

Figure 8:
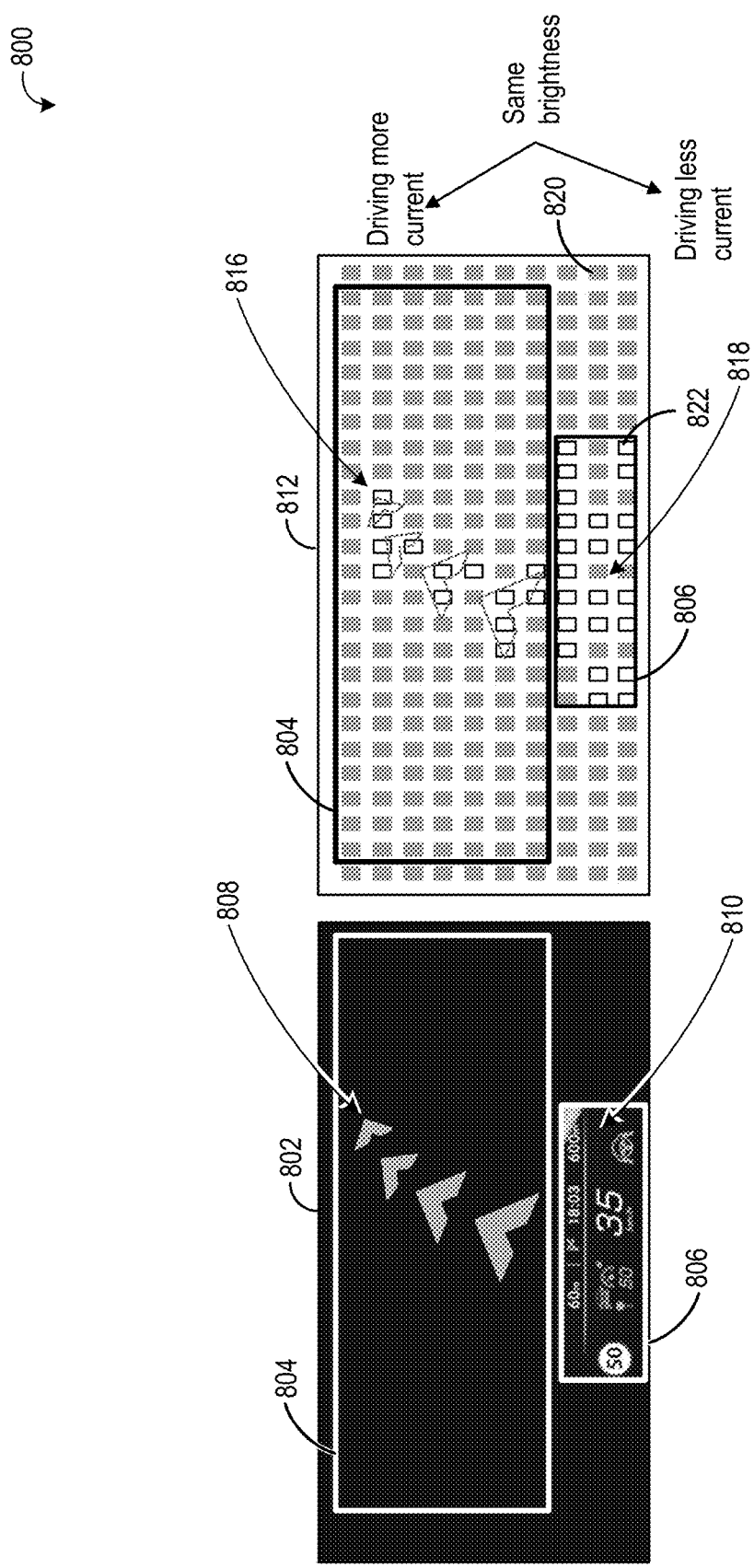
FIG. 8 shows an example display and backlight output for a multi depth heads up display in accordance with one or more embodiments of the present disclosure.

An additional or alternative embodiment for a heads up display 800 is described in FIG. 8. Heads up display 800, including display content 802 and LED array 812, implements a multi depth windshield heads up display type. As one example, heads up display 800 may be generated following control routines the same or similar to method 300 and method 400 in FIG. 3 and FIG. 4, respectively. Heads up display 800 may be included in a heads up display system such as described in FIG. 1 and FIG. 2.

Heads up display 800 may be used for static information display (e.g., near-field) and/or dynamic information display (e.g., far-field). In the example, heads up display 800 depicts display content 802 including a dynamic area 804 separate from a static area 806, illustrating an example dual depth heads up display. In dynamic area 804, turn by turn content 808 is shown. The static area 806 shows instrument panel 810. Dynamic area 804 and static area 806 are indicated on LED array 812. A dim LED block 820 is indicated as a grey block. A driven LED block 822 is indicated as a black outlined block.

Individual LED blocks in LED array 812 are individually driven within static area 806. Static information, such icons in instrument panel 810, will be input to a look-up table (e.g., look-up table 500, look-up table 700) and depending on the size, position, and shape of the content LEDs will be selectively driven or dimmed. In the dynamic area 804, content (e.g., an icon) may be produced at different sizes depending on the position in the display. A scale factor may be applied without multiple look-up tables depending on displayed distance to vary the size of the display region of light. As shown in display content 802, turn by turn content 808 comprises a plurality of fish bones at various sizes and degrees of rotations.

Turning to LED array 812, LED blocks 818 are driven in the array based on the output of the look-table. LED blocks 816 are driven in the array area corresponding with turn by turn content 808 with increasing current applied based on the depth of the display to calibrate brightness between static and dynamic region. For example, by driving more current to one or more dynamic regions and/or display content at greater distance and by driving less current to one or more static regions and/or display content at closer distance, a multi depth display may produce uniform brightness and compensate display brightness variability based on position information.

In this way, by executing parallel processes, images may be generated and displayed during vehicle operation using a selectively dimmed LED backlight array responsive to real-time user inputs and vehicle operating parameters. Categorizing display content, such as by type, size, and position, allows for use of an efficient look-up table to enable selective dimming without high CPU-demanding image analysis algorithms. Moreover, image display may be controlled in the manner described herein in a variety of heads up display environments including static and dynamic display types. Controlling an image generating system in this way, with more efficient LED usage, and by adjusting backlighting areas without specific analysis of displayed images (e.g., pixels or groups of pixels), the technical effect of reducing power consumption and heat production may be achieved. Such a system may resolve thermal issues using a smaller heat sink and therefore allow for overall reductions in the size of the image generating device.

The disclosure also provides support for a method for controlling backlighting of a heads up display of a vehicle, comprising: adjusting different backlighting regions of the heads up display differently without analyzing a displayed image. In a first example of the method, the different backlighting regions include a first region and a second region that do not overlap, wherein the adjusting is based on a vehicle operating parameter. In a second example of the method, optionally including the first example, the different backlighting regions include a first region and a second region that do not overlap, wherein the adjusting is based on user input. In a third example of the method, optionally including one or both of the first and second examples, the different backlighting regions include a first region and a second region that do not overlap, wherein the adjusting is based on a vehicle mode. In a fourth example of the method, optionally including one or more or each of the first through third examples, the backlighting is controlled via a backlight with an array of light emitting elements, and wherein the different backlighting regions include separate adjacent groups of light emitting elements. In a fifth example of the method, optionally including one or more or each of the first through fourth examples, the adjusting is based on a look-up table, an output of the look-up table including a respective backlight level for each separate region, and wherein a plurality of inputs for the look-up table include real-time user inputs and vehicle operating parameters. In a sixth example of the method, optionally including one or more or each of the first through fifth examples, when adjusting a backlight level of a region from a first value to a second value, the adjusting is ramped over a transition duration to gradually change light levels of the region. In a seventh example of the method, optionally including one or more or each of the first through sixth examples, the method further comprises: dividing a backlight into a plurality of non-overlapping regions based on vehicle operating conditions and/or user input during vehicle operation, wherein the adjusting includes varying a power level to each of the plurality of non-overlapping regions responsive to vehicle operating conditions and/or user input. In an eighth example of the method, optionally including one or more or each of the first through seventh examples, the plurality of non-overlapping regions includes during a first set of conditions, dividing the backlight into at least a first region, a second region, and a third region, with power set for the first region, the second region, and the third region at a first level, a second level, and a third level, respectively, and during a second set of conditions different from the first, setting the power for the first region, the second region, and the third region at a fourth level, a fifth level, and a sixth level, respectively, each level different from every other level. In a ninth example of the method, optionally including one or more or each of the first through eighth examples, the plurality of non-overlapping regions includes during a first set of conditions, dividing the backlight into at least a first region, a second region, and a third region, with power set for the first region, the second region, and the third region at a first level, a second level, and a third level, respectively, and during a second set of conditions different from the first, dividing the backlight into at most a first region and a second region, and setting the power for the first region, and the second region at a fourth level, and a fifth level, respectively, each level different from every other level.

The disclosure also provides support for a system for a vehicle, comprising: an image generating unit, a backlight coupled with the image generating unit to illuminate an image for display in a heads up display of the vehicle, and a control system with a processor and instructions that when executed, power different backlighting regions of the backlight to generate different levels of light without analyzing the image. In a first example of the system, the different backlighting regions include a first region and a second region that do not overlap, wherein the power is adjusted based on a vehicle operating parameter. In a second example of the system, optionally including the first example, a size of the different regions is adjusted based on a vehicle operating parameter. In a third example of the system, optionally including one or both of the first and second examples, the different backlighting regions include a first region and a second region that do not overlap, wherein the power is adjusted based on user input, and wherein a size of the different backlighting regions is adjusted based on a vehicle operating parameter. In a fourth example of the system, optionally including one or more or each of the first through third examples, the different backlighting regions include a first region and a second region that do not overlap, wherein the power to different backlighting regions is adjusted based on a vehicle mode. In a fifth example of the system, optionally including one or more or each of the first through fourth examples, the backlight has an array of light emitting elements, and wherein different backlighting regions of the backlight include separate adjacent groups of light emitting elements. In a sixth example of the system, optionally including one or more or each of the first through fifth examples, the power is adjusted based on a look-up table, an output of the look-up table including a respective backlight level for each separate region, and wherein a plurality of inputs for the look-up table include real-time user inputs and vehicle operating parameters. In a seventh example of the system, optionally including one or more or each of the first through sixth examples powering the different backlighting regions includes adjusting a backlight level of a region from a first value to a second value, the adjusting being ramped over a transition duration to gradually change light levels of the region. The disclosure also provides support for a method for controlling backlighting of a heads up display of a vehicle, comprising: dividing an array of light sources of a backlight into a plurality of different backlighting regions based on a vehicle operating condition, and powering each of the plurality of different backlighting regions with a different power level, each of the different power levels adjusted responsive to the vehicle operating condition without analyzing a displayed image on the heads up display. In a first example of the method, the method further comprises: feeding the vehicle operating condition to a look-up table to generate the different power levels for each of the plurality of different backlighting regions without analyzing a displayed image on the heads up display.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the display controller 214 described with reference to FIG. 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for controlling backlighting of a heads up display of a vehicle, comprising:
    receiving information about a displayed image;
    adjusting different backlighting regions of the heads up display differently based on the information without analyzing pixels or groups of pixels of the displayed image,
    wherein the information comprises one or more of a type, a size, and a location of the displayed image; and
    dividing a backlight into a plurality of non-overlapping regions based on vehicle operating conditions and/or user input during vehicle operation,
    wherein the adjusting includes varying a power level to each of the plurality of non-overlapping regions responsive to vehicle operating conditions and/or user input,
    wherein the plurality of non-overlapping regions includes during a first set of conditions, dividing the backlight into at least a first region, a second region, and a third region, with power set for the first region, the second region, and the third region at a first level, a second level, and a third level, respectively; and during a second set of conditions different from the first, setting the power for the first region, the second region, and the third region at a fourth level, a fifth level, and a sixth level, respectively.

2. The method of claim 1, wherein the information includes a vehicle operating parameter.

3. The method of claim 1, wherein the information includes a user input.

4. The method of claim 1, wherein the information includes a vehicle mode.

5. The method of claim 1, wherein the backlighting is controlled via a backlight with an array of light emitting elements, and wherein the different backlighting regions include separate adjacent groups of light emitting elements.

6. The method of claim 1, wherein the adjusting is further based on a look-up table, an output of the look-up table including a respective backlight level for each separate region, and wherein a plurality of inputs for the look-up table include real-time user inputs and vehicle operating parameters included in the received information.

7. The method of claim 1, wherein when adjusting a backlight level of a region from a first value to a second value, the adjusting is ramped over a transition duration to gradually change light levels of the region.

8. The method of claim 1, wherein the first level is different from the fourth level and/or the second level is different from the fifth level and/or the third level is different from the sixth level.

9. The method of claim 1, wherein the plurality of non-overlapping regions includes each level different from every other level.

10. A system for a vehicle, comprising:
    an image generating unit;
    a backlight coupled with the image generating unit to illuminate an image for display in a heads up display of the vehicle; and
    a control system with a processor and instructions that, when executed comprise:
        receiving information about a displayed image;
        powering different backlighting regions of the backlight to generate different levels of light based on the received information without analyzing pixels or groups of pixels of the image, wherein the information comprises one or more of a type, a size, and a location of the displayed image; and
        dividing a backlight into a plurality of non-overlapping regions based on vehicle operating conditions and/or user input during vehicle operation, wherein the powering includes varying a power level to each of the plurality of non-overlapping regions responsive to vehicle operating conditions and/or user input, wherein the plurality of non-overlapping regions includes during a first set of conditions, dividing the backlight into at least a first region, a second region, and a third region, with power set for the first region, the second region, and the third region at a first level, a second level, and a third level, respectively; and during a second set of conditions different from the first, setting the power for the first region, the second region, and the third region at a fourth level, a fifth level, and a sixth level, respectively.

11. The system of claim 10, wherein the information includes a vehicle operating parameter.

12. The system of claim 10, wherein a size of the different backlighting regions is adjusted based on a vehicle operating parameter.

13. The system of claim 10, wherein the information includes a user input, and wherein a size of the different backlighting regions is adjusted based on a vehicle operating parameter.

14. The system of claim 10, wherein the information includes a vehicle mode.

15. The system of claim 10, wherein the backlight has an array of light emitting elements, and wherein different backlighting regions of the backlight include separate adjacent groups of light emitting elements.

16. The system of claim 10, wherein the power is further adjusted based on a look-up table, an output of the look-up table including a respective backlight level for each separate region, and wherein a plurality of inputs for the look-up table include real-time user inputs and vehicle operating parameters included in the received information.

17. The system of claim 10, wherein powering the different backlighting regions includes adjusting a backlight level of a region from a first value to a second value, the adjusting being ramped over a transition duration to gradually change light levels of the region.

18. A method for controlling backlighting of a heads up display of a vehicle, comprising:
   dividing an array of light sources of a backlight into a plurality of different backlighting regions based on a vehicle operating condition;
   powering each of the plurality of different backlighting regions with a different power level, each of the different power levels adjusted responsive to the vehicle operating condition without analyzing pixels or groups of pixels of a displayed image on the heads up display,
   wherein the vehicle operating condition comprises one or more real-time user inputs and vehicle operating parameters categorized by type, size, and region of display; and
   dividing a backlight into a plurality of non-overlapping regions based on vehicle operating conditions and/or user input during vehicle operation, wherein the adjusting includes varying a power level to each of the plurality of non-overlapping regions responsive to vehicle operating conditions and/or user input,
   wherein the plurality of non-overlapping regions includes during a first set of conditions, dividing the backlight into at least a first region, a second region, and a third region, with power set for the first region, the second region, and the third region at a first level, a second level, and a third level, respectively; and during a second set of conditions different from the first, setting the power for the first region, the second region, and the third region at a fourth level, a fifth level, and a sixth level, respectively.

19. The method of claim 18, further comprising feeding the vehicle operating condition to a look-up table to generate the different power levels for each of the plurality of different backlighting regions without analyzing a displayed image on the heads up display.

* * * * *